(12) United States Patent
Grove et al.

(10) Patent No.: US 7,543,063 B1
(45) Date of Patent: Jun. 2, 2009

(54) DEVICE TO TERMINATE A MODEM RELAY CHANNEL DIRECTLY TO AN IP NETWORK

(75) Inventors: Vincent T. Grove, Concord, MA (US); Herbert M. Wildfeuer, Santa Barbara, CA (US); Mehryar Khalili Garakani, Westlake Village, CA (US); Bruce D. Juhlin, Pleasanton, CA (US); Scott Anthony Boynton, San Jose, CA (US)

(73) Assignee: CISCO Technology, Inc., San Jose, CA (US)

( * ) Notice: Subject to any disclaimer, the term of this patent is extended or adjusted under 35 U.S.C. 154(b) by 559 days.

(21) Appl. No.: 10/144,154

(22) Filed: May 10, 2002

(51) Int. Cl.
*G06F 15/16* (2006.01)
(52) U.S. Cl. ........................ 709/227; 709/236
(58) Field of Classification Search ......... 370/352–464; 709/227–229, 223–226, 246–247
See application file for complete search history.

(56) References Cited

U.S. PATENT DOCUMENTS

| | | | |
|---|---|---|---|
| 4,965,641 A | 10/1990 | Blackwell et al. | 375/7 |
| 5,862,202 A | 1/1999 | Bashoura et al. | |
| 6,282,193 B1 | 8/2001 | Hluchyj et al. | 370/357 |
| 6,757,367 B1 * | 6/2004 | Nicol | 379/90.01 |
| 6,785,371 B1 | 8/2004 | Olafsson | |
| 6,788,651 B1 | 9/2004 | Brent et al. | |
| 6,882,711 B1 * | 4/2005 | Nicol | 379/93.33 |
| 6,914,899 B2 | 7/2005 | Siegrist et al. | |
| 6,959,005 B1 | 10/2005 | Osler et al. | |
| 6,967,946 B1 | 11/2005 | Tackin et al. | |
| 6,986,157 B1 * | 1/2006 | Fijolek et al. | 725/111 |
| 7,016,475 B2 | 3/2006 | Resuta | |

(Continued)

FOREIGN PATENT DOCUMENTS

EP 0 789 470 A2 8/1997

(Continued)

OTHER PUBLICATIONS

White Paper, "Modem Over IP," Mindspeed Technologies, Apr. 2002, pp. 1-10.

(Continued)

*Primary Examiner*—Patrice Winder
*Assistant Examiner*—Thomas Duong
(74) *Attorney, Agent, or Firm*—Hamilton Brook Smith & Reynolds, PC (57) ABSTRACT

A modem data aggregating gateway that supports modem relay functionality for permitting reliable switching of modem traffic between a VoIP network and a data packet switch Internet Protocol (IP) network, s.a. the Internet. The modem relay aggregator may receive modem data encapsulated as Voice over IP (VoIP) data packets in accordance with a Simple Reliable Protocol Transport (SRPT) mechanism. The packet data may be error corrected and/or decompressed before being repackaged for forwarding to the ultimate destination. In the event that the destination is itself an IP device, the modem relay aggregator may forward the packets directly over the IP network. As a result, if the destination of a modem call is an IP device (such as a Web site or other Internet-enabled device) the technique eliminates two points from a processing path in which digital signal processing (DSPs) would otherwise have to perform modem protocol processing. Otherwise, minimal modem reformatting can be performed at the aggregation point.

24 Claims, 11 Drawing Sheets

U.S. PATENT DOCUMENTS

| | | | |
|---|---|---|---|
| 7,072,337 B1 | 7/2006 | Arutynor et al. | |
| 7,075,979 B2 | 7/2006 | Beadle et al. | |
| 7,133,934 B1 | 11/2006 | Rosello et al. | |
| 7,155,538 B1 | 12/2006 | Rosello et al. | |
| 7,161,931 B1* | 1/2007 | Li et al. | 370/352 |
| 2002/0041591 A1* | 4/2002 | Hluchyj | 370/354 |
| 2002/0118671 A1* | 8/2002 | Staples et al. | 370/352 |
| 2003/0065787 A1* | 4/2003 | Osafune et al. | 709/227 |
| 2003/0123466 A1* | 7/2003 | Somekh et al. | 370/401 |
| 2003/0185230 A1* | 10/2003 | Fisher et al. | 370/464 |
| 2004/0022241 A1 | 2/2004 | Boynton et al. | |
| 2004/0105426 A1 | 6/2004 | Grove et al. | |
| 2004/0190499 A1 | 9/2004 | Chen et al. | |
| 2004/0196833 A1 | 10/2004 | Dahan et al. | |
| 2004/0218739 A1* | 11/2004 | Nicol | 379/93.33 |
| 2006/0002539 A1 | 1/2006 | Fang | |

FOREIGN PATENT DOCUMENTS

| | | |
|---|---|---|
| EP | 1 054 569 | 11/2000 |
| EP | 1 054 569 A1 | 11/2000 |
| WO | WO 98/48542 | 10/1998 |
| WO | WO 98/58492 | 12/1998 |
| WO | WO 0054468 | 9/2000 |
| WO | WO 01/20859 A1 | 3/2001 |
| WO | WO 01/65786 A1 | 9/2001 |
| WO | WO 01/91371 A2 | 11/2001 |
| WO | WO 01/91441 A1 | 11/2001 |
| WO | WO 01/97499 A1 | 12/2001 |
| WO | WO 03/096629 | 11/2003 |
| WO | WO 03/096642 | 11/2003 |
| WO | WO 03/096666 | 11/2003 |

OTHER PUBLICATIONS

M. Coffee, "Why Use Modem-over-IP?", *CommWeb*, Jul. 30, 2002, pp. 1-3, http://www.commweb.com/article/COM20020612S0002.

"Procedures for real-time Group 3 facsimile communication over IP networks," ITU-T Recommendation T-38, pp. 1-30 (1998).

Somekh, Oren, "Modem over Packet Networks Technology," Electron.Prod.Des., XP009015577, 22(11):54-58(2001).

White Paper, "Modem Over IP," Mindspeed Technologies, Apr. 1-10, 2002.

M. Coffee, "Why Use Modem-over-IP?", CommWeb, Jul. 30, 2002, pp. 1-3, http://www.commweb.com/article/COM20020612S0002.

"Series V: Data Communication Over the Telephone Network," International Telecommunication Union, 19 pages, Nov. 2000.

* cited by examiner

DEVICE TO TERMINATE A MODEM RELAY CHANNEL DIRECTLY TO AN IP NETWORK

BACKGROUND OF THE INVENTION

Most home computer users are now connected to a network such as the Internet in one way or another. The most popular connection technique still is to use the Public Switched Telephone Network (PSTN) and a device called a modem. As is now quite familiar to even the general population, a modem makes a connection by dialing a telephone number of an Internet Service Provider (ISP), who maintains equipment that connects to the Internet. Digital signals generated by the user's computer are converted to analog signals and vice versa by the modem such that they may be carried over the telephone lines accurately.

What is less familiar to the public at large is the configuration of the ISP equipment and how it provides connections to the Internet. ISPs such as America Online (AOL) maintain a very large number of dial-up access points. These access points permit a user to dial a local telephone number, which then connects the call to a local central office. The central office switch, which may be a so-called Class 5 switch, then directs the call to a dial termination point. The dial termination point may be located in or behind the central office, such as at a computer network Point of Presence (POP). At the POP, a device called a Remote Access Server (RAS) terminates the connection. There, Terminating Modems (TM) at the RAS are often aggregated together. In particular, the RAS contains a large number of modem devices that are used to connect to transmit and receive modem signals to and from the user Originating Modems (OM).

From the RAS, which converts signals back to digital form, the signals may be carried through a packet based network, such as an Internet Protocol (IP) network, to the Internet. In some instances, large service providers such as AOL contract with network service providers such as Genuity or UUNet to carry traffic from local central office switches to remote access server locations over high-speed digital lines.

However, other paradigms are resulting in fundamental changes in the nature of the telephone network. Most notably is the change to carry voice traffic from central offices over digital transport networks using technologies originally intended for carrying data traffic such as Internet Protocol (IP). So-called Voice-over-IP (VoIP) packet networks are envisioned to be the architecture of choice of the future for voice transport.

Figure 1:
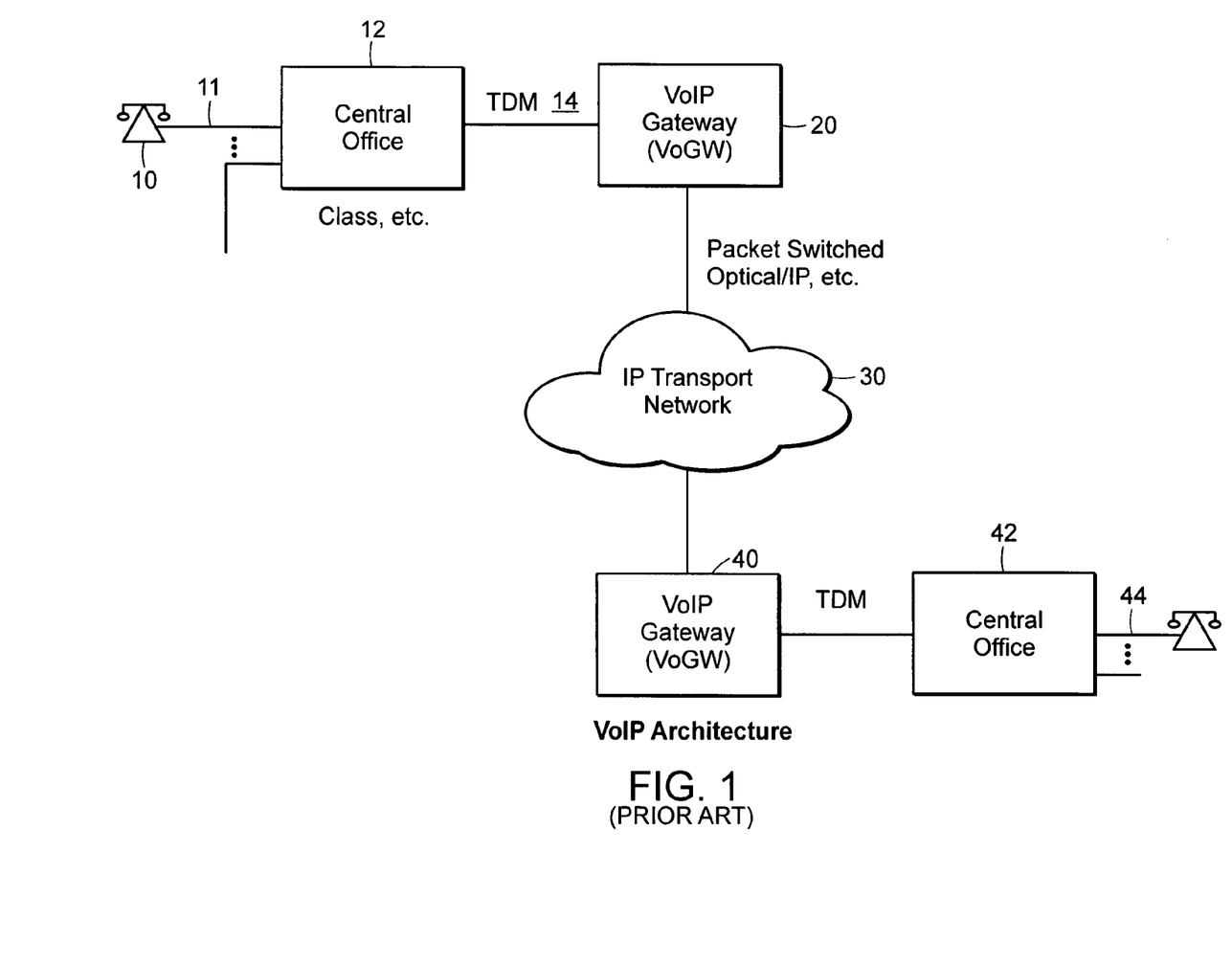
FIG. 1 is a block diagram of a prior art telecommunications network for handling modem traffic.

In this architecture, shown at a high level in FIG. 1, a Central Office (CO) 12 can aggregate multiple Plain Old Telephone Service (POTS) type voice connections 10, multiplexing them into a digital Time Division Multiplex (TDM) transport 14 format such as T1 or E1 carriers. This permits the use of digital technologies to transport voice signals to a transit location in which is installed a Voice Gateway (VoIP GW) 20. The VoIP GW converts the TDM signals to a packet switched transport format, forwarding them to an IP network 30. At the other side of the IP network, a second VoIP GW 40 receives the signals, converts them back to TDM format, and forwards them to a far end Central Office (CO) 42 which then further forwards signal to individual far end POTS connections 44.

As telecom networks migrate to a VoIP architecture, it becomes important to support various types of calls that a user wishes to make over the TDM network. At present, there are standards for carrying voice, touch tone (Dual-Tone, Multi-Frequency (DTMF)) dialed digits, and fax signaling over IP connections. While there remains an effort to develop standards for carrying modem traffic over TDM connections, there is no standard yet adopted to date for reliable transport of modem signals over IP connections.

One effort towards solving this problem is so-called modem relay transport. Modem relay is being considered by the International Telecommunications Union (ITU) and Internet Engineering Task Force (IETF), with an aggressive schedule to ratify standards in the near future.

Figure 2:
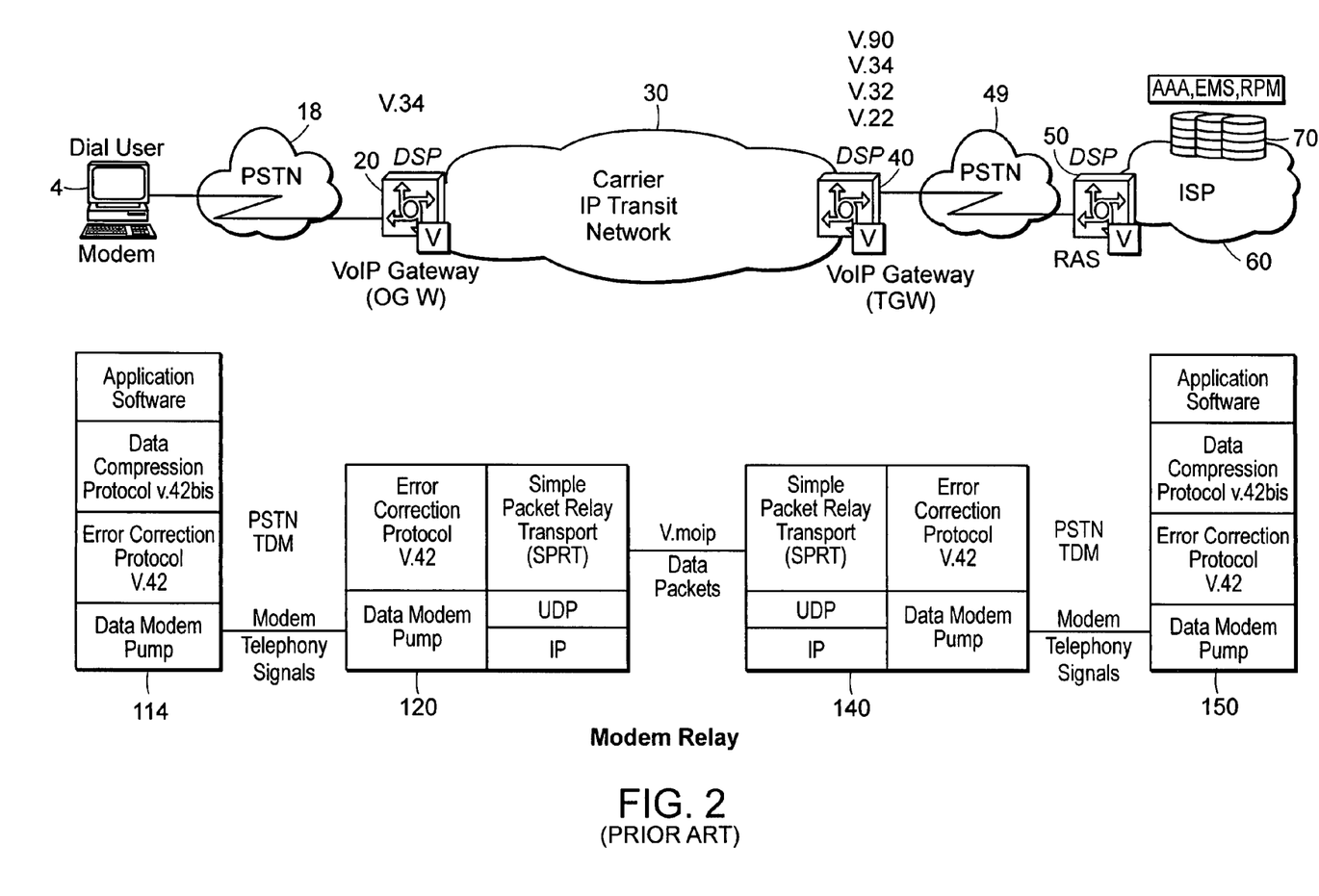
FIG. 2 is a block diagram of a prior art modem relay network.

The basic idea behind this architecture is to insert "modem relay" capability into the VoIP GW. Such an architecture is shown in FIG. 2. Here, the dial modem 14 acts as an origin point for a call to a destination point which may be an Internet Service Provider (ISP) 60. The modem call is first typically forwarded to a Class 5 or other central office switch in the standard fashion over a circuit switched PSTN 18. The Class 5 switch (not shown in FIG. 2) connects the call through the PSTN 18 to an Originating Voice Gateway (OGW) 20, which supports modem relay.

The OGW 20 implements some amount of modem intelligence (i.e., converting data between analog and digital form) so as to be carried over an IP network 30 to a Terminating Gateway (TGW) 40. This may consist of, for example, (de)modulating the modem protocol data (such as V.34), applying an error correction protocol (V.42), and encapsulating the resulting data modem as a Simple Packet Relay Transport (SPRT) packet.

The TGW 40 receives this "Modem over IP" (MoIP) formatted packet and then converts it back to a TDM format so that it can be transported over another PSTN 44 connection to a Remote Access Server (RAS) 50. This involves stripping off the SPRT formatting, performing error correction V.42 and data modulation protocol (e.g., V.90, V.34, V.32, V.22 etc.) formatting. From the Remote Access Server, the packet is then passed over a pure TDM network 44 to the ISP 60. Here, the data is (de)modulated and error corrected by the terminating modem (RAS).

In this modem relay architecture, both the OGW 20 and the TGW 40 must include some amount of modem intelligence in order to permit proper transport of the modem signals over the IP network. In particular, they should perform basic portions of a modem protocol stack processing, as shown. A Digital Signal Processor (DSP) located in each of the gateways 20 and 40 and at the RAS 50 performs the required protocol translations. At the lowest layer of the protocol stack, this includes a physical layer performing modulation/demodulation or data "modem pump" functions in accordance with modem standards (V.90, V.34, V.32, V.22, and the like). The modem enabled gateways 20 and 40 also perform secondary physical layer functions such as error detection and error correction as specified by V.42 or V.44, for example.

The gateways 20 and 40 also perform tasks associated with network layer tasks. This may, for example, consist of layering a Simple Packet Relay Transport (SPRT) over UDP to format data signals so that they may be properly transported over the IP network 30. Note that the SPRT packets are still compressed (per V.42 bis or V.44) when so forwarded.

SUMMARY OF THE INVENTION

Basically, the present invention comes about from realizing that one can eliminate one of the PSTN legs of the modem relay call and consequently eliminate a large part of the modem process. Consider that only certain portions of the physical layer modem processing need be performed by the Terminating Gateway (TGW) in order to make the signals compatible for transport over the Internet. Specifically, at an originating point, the users' data is formatted as modem signals and transported to an Originating Gateway (OGW), as with prior art modem relay operations. However, we have noted that the modem signals are already formatted as digital data when they arrive at the Terminating Gateway. Thus, when the destination is ultimately an Internet node, the final PSTN leg can be eliminated, and modem modulation/demodulation signal processing need not be performed at all. The Terminating Gateway (TGW) can therefore simply forward packets to the destination IP network, and with a small amount of processing, can replace the other modem relay functions associated with prior art TGWs and RAS.

With this architecture, a new device called a Modem Relay Aggregator (MRA) is used. The OGW functions as it does in a modem relay (MR) call, forwarding the modem-over-IP (MoIP) packets to a TGW location. However, the Modem Relay Aggregator (MRA) replaces the functionality of both the Terminating Gateway and the RAS, performing decompression and any application layer processing required, such as PPP termination.

The MRA therefore replaces the Terminating Gateway, and communicates directly with destination IP devices. This technique provides a much simpler termination for a modem relay solution.

As a result, an MRA provides a reliable transport for modem traffic across a packet network. It avoids demodulating the modem signal for delivery to the PSTN side of the interface, and then simply sends the encapsulated data to the packet network, eliminating the final PSTN leg. The other system components do not have to complete the aspects of traditional modem relay call processing.

Using the invention, Internet Service Providers (ISPs) can terminate subscribers' modem sessions transported over a VoIP network using MR. The voice gateway at the originating site need only be modified to support capabilities such as data modulation, error detection, and error correction.

Several other advantages occur as a result. For example, if the destination of a modem call is an IP device such as a web site, this technique eliminates the need to implement Digital Signal Processing (DSP) to modulate or demodulate signals in at least two locations (namely the TGW and the RAS). This creates the opportunity for more efficient network architectures.

Indeed, a RAS is also not required. A single device with relatively simple requirements can therefore replace both the RAS and the Terminating Gateway in a conventional modem relay network. An example of a single device may be a computing device having a general purpose or application-specific processor executing software, interfaces(s) to communicate with other network devices, and memory unit to store the software and data packets.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

A description of a preferred embodiment of the invention follows.

Figure 3:
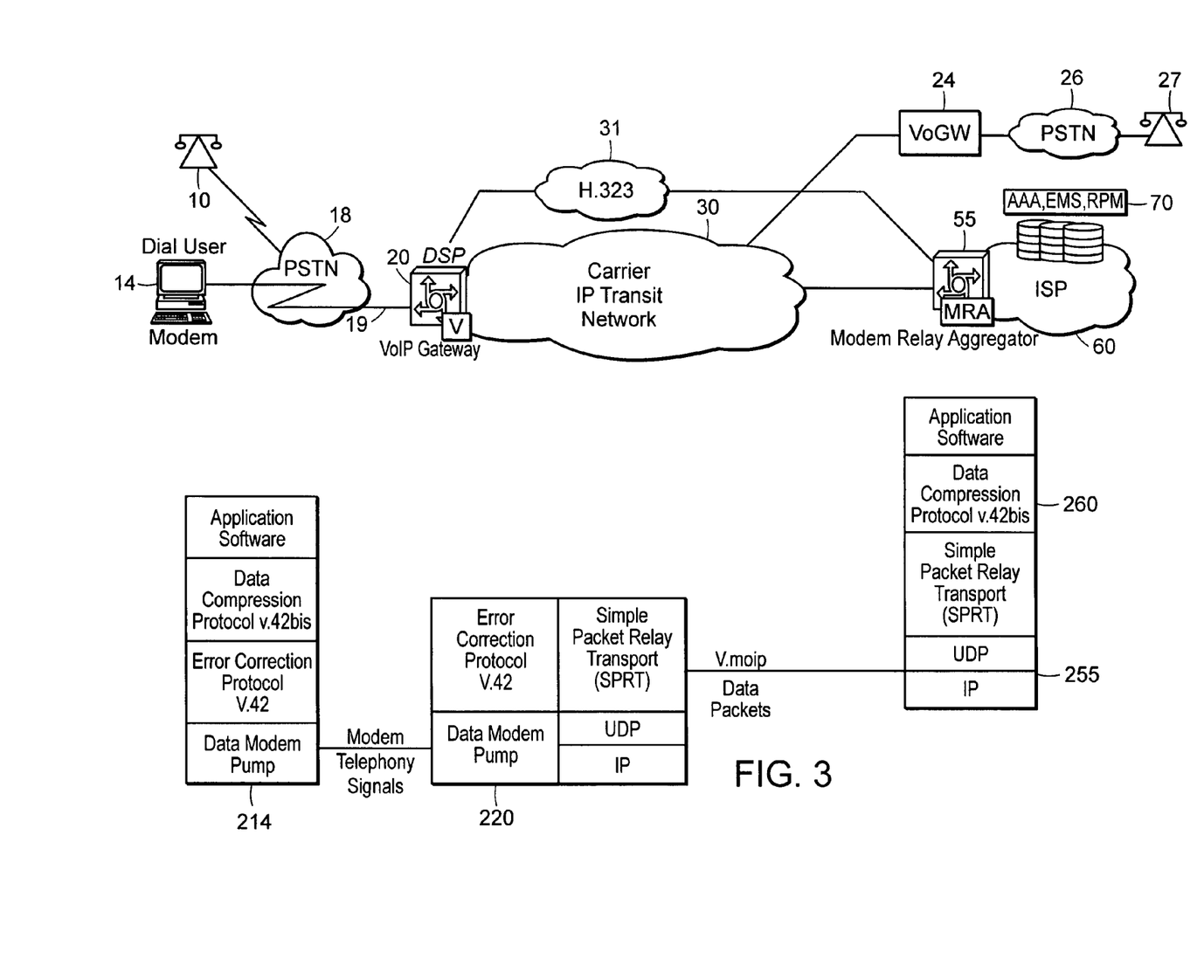
FIG. 3 is a diagram of a modem relay network in accordance with the present invention.

FIG. 3 is a block diagram of a telecommunications network that implements modem relay in a Voice over Internet Protocol (VoIP) network. In such a network, a customer has a telephone that receives and places voice calls to and from another telephone 27. Voice signals are caused to travel over a Public Switched Telephone Network (PSTN) 18 through one or more local central offices (not shown). The central offices include switching equipment such as a Class 5 (C5) switch to aggregate such calls onto a digital Time Division Multiplex (TDM) carrier such as a T1 carrier signal, in a manner that is well known in the art.

According to well known telephone VoIP voice call control signaling techniques, a voice call is set up by providing a connection through a transport network, such as a Time Division Multiplex (TDM) transport network 19, to an Originating VoIP Gateway 20. The Voice over IP (VoIP) Gateway (VoIP GW) is typically used for carrying voice traffic. In this instance, the TDM voice signals are converted to packet format so that they may be carried over IP network 30 to a Terminating Gateway 24. The Terminating Gateway 24 in turn converts the modem signals to a TDM format (PCM) to be transported feeds signals to a distant Central Office via the PSTN 26. This in turn provides a connection to the destination telephone 27. Voice traffic may thus be carried in this way over the IP network 30 in a manner that is well known in the art.

The present invention is related to the transmission of modem signals through the VoIP network or so-called Modem over IP (MoIP) transmission. Computer modem signals originating at a customer modem 14, for example, are fed through the carrier IP transit network 30 through a modem relay aggregator 55 to reach Internet connections available such as through an Internet Service Provider (ISP) 60. The ISP 60 in turn provides connections to computer networks 70 such as the Internet, to obtain data, view World Wide Web sites, and the like.

In accordance with the principles of the present invention, the terminating gateway device (in this instance, the Modem Relay Aggregator (MRA) 55) requires no conversion to Time Division Multiplex (TDM) format for transport over a second PSTN connection as in the case with the prior art modem relay architecture of FIG. 2. Rather, the present invention takes advantage of implementing modem relay functionality and Internet gateway functionality in the same device. The MRA 55 is thus a new category of telecommunication devices that may operate at the destination end of the carrier IP transit network 30. Here, the MRA 55 completes termination of the modem protocol stack and acts as a gateway to the Internet 70 without the need to traverse the PSTN a second time.

At the time the modem call is set up, control signaling recognizes the call as a modem call and makes the call destination a modem-relay-aggregator (MRA) enabled VoIP GW 20 rather than a Remote Access Server (RAS) (as in the case with the prior art modem relay network shown in FIG. 2). In practice, modem functionality 220 is supported in the OGW, specifically the ability to perform physical layer modulation/demodulation processing (data modem pump). Thus, when modem signals are received from the customer modem 14 at the Originating Gateway (OGW) 20, only a demodulation function is performed. Likewise, signals to be sent to the customer modem 14 originating from the IP network 30 are remodulated and sent over the TDM network 19. However, that is all the processing that the OGW 20 must perform.

The OGW 20 thus makes a call to a Modem Relay Aggregator 55, setting up a connection through the IP network 30. The connection may be made through standardized call control signaling (e.g., via an H.323 network 31) in a manner that is well known in the art. After opening the call connection to the MRA 55, the modem data can then be transported over the IP network 30 in compressed form, arriving at the MRA 55.

Other than demodulating the modem signal and performing error detection and correction, the OGW 20 does not need to complete the remaining aspects of traditional modem termination. For example, decompression and PPP or other transport layer protocols need not be provided by the modem functionality 40 in the Originating Gateway 20. The IP network 30 then carries the compressed and still frame formatted data over the IP network 30 to the MRA 55. It should be noted that a single MRA 55 can perform modem traffic aggregation for a number of different connections.

The destination IP device 70 may be any IP enabled device such as an Internet gateway, router, IP switch, or other internetworking device that is IP addressable.

The Modem Relay Aggregator (MRA) 55 may typically perform a number of functions once in a modem relay state. For example, after negotiating an MR session with the OGW 20, the MRA 55 can remove the IP-based encapsulation implemented by a Simple Packet Relay Transport protocol (SPRT) added at the Originating Gateway (OGW) 20. In a next step, the data is decompressed and any application layer processing, such as PPP processing, may be performed, if needed.

The resulting new IP packet having a destination address for the IP device 70 may then be created. Once this is complete, the MRA 55 may then forward the packet over the packet switched network such as represented by the ISP 60 where it is routed to the destination device 70.

Figure 4:
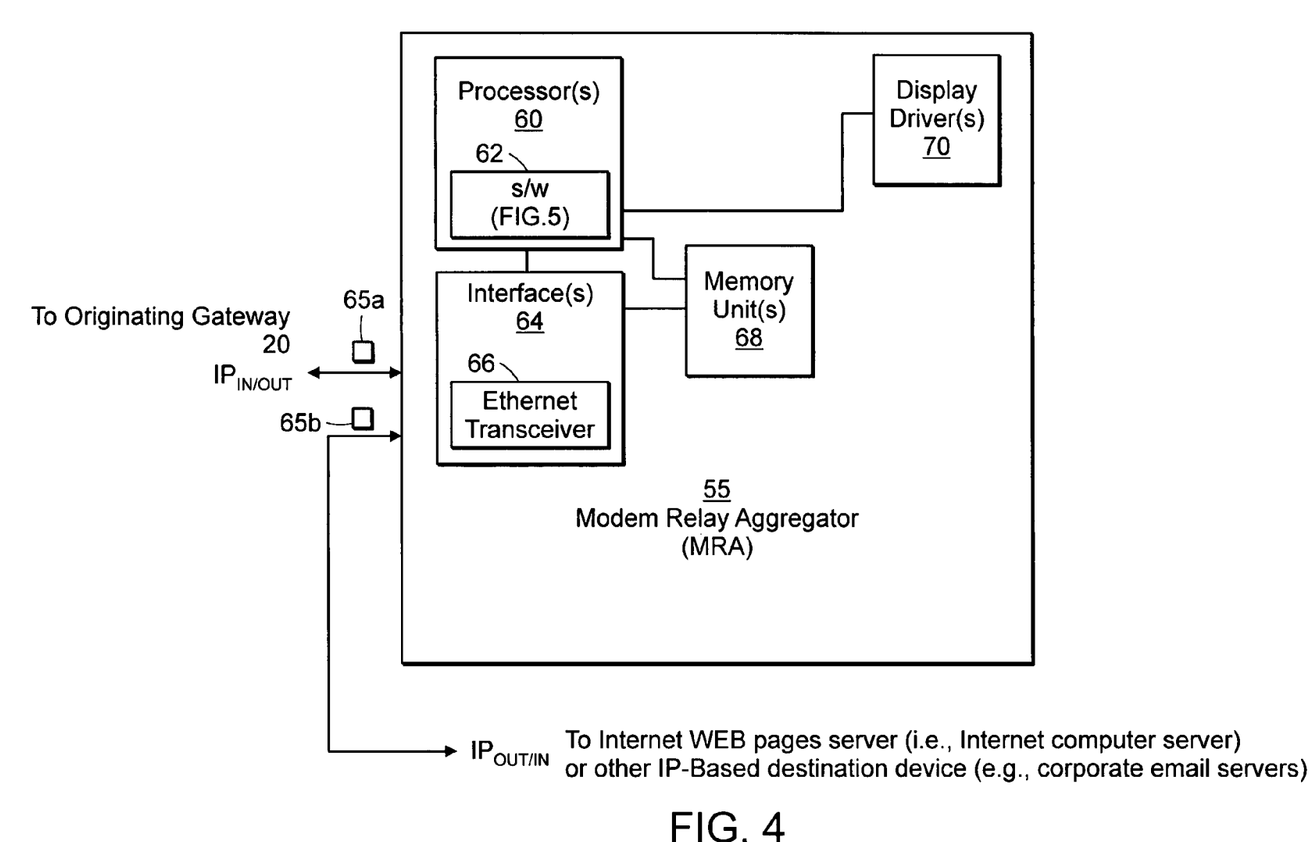
FIG. 4 is a generalized block diagram of a modem relay aggregator (MRA) used in the modem relay architecture of FIG. 3.

FIG. 4 is a generalized block diagram of an embodiment of the MRA 55. The MRA 55 includes at least one processor 61 executing software 62, at least one interface 64 connected to the processor(s) 61, at least one memory unit 68 connected to the interface(s) 64 and processor(s) 61, and a display driver 69 connected to the processor(s) 61. The interface(s) 64 may include an ethernet transceiver 66 for data traffic.

The interface(s) 64 input/output IP packets 65a to and from the originating gateway 20. The interface(s) 64 also communicate IP packets 65b to and from a local or remote computer (not shown).

The software 62 executed by the processors 61 provides processing for the IP packets 65a, 65b in both the forward and reverse directions (i.e., from the originating gateway 20 to an end node computer or vice versa). The software effectively provides the functionality of the terminating gateway and remote access server of the prior art, and, because of this collapsed functionality, the software allows the elimination of the previously redundant functions of remodulating the data (i.e., terminating voice gateway function) and demodulating the data (i.e., remote access server function). Thus, the MRA 55 does not need to include a digital signal processor (DSP) to perform its operations since the Layer 1 modulation/demodulation processing need not be done in the MRA 55. A flow diagram of the generalized software is shown in FIG. 5.

Figure 5:
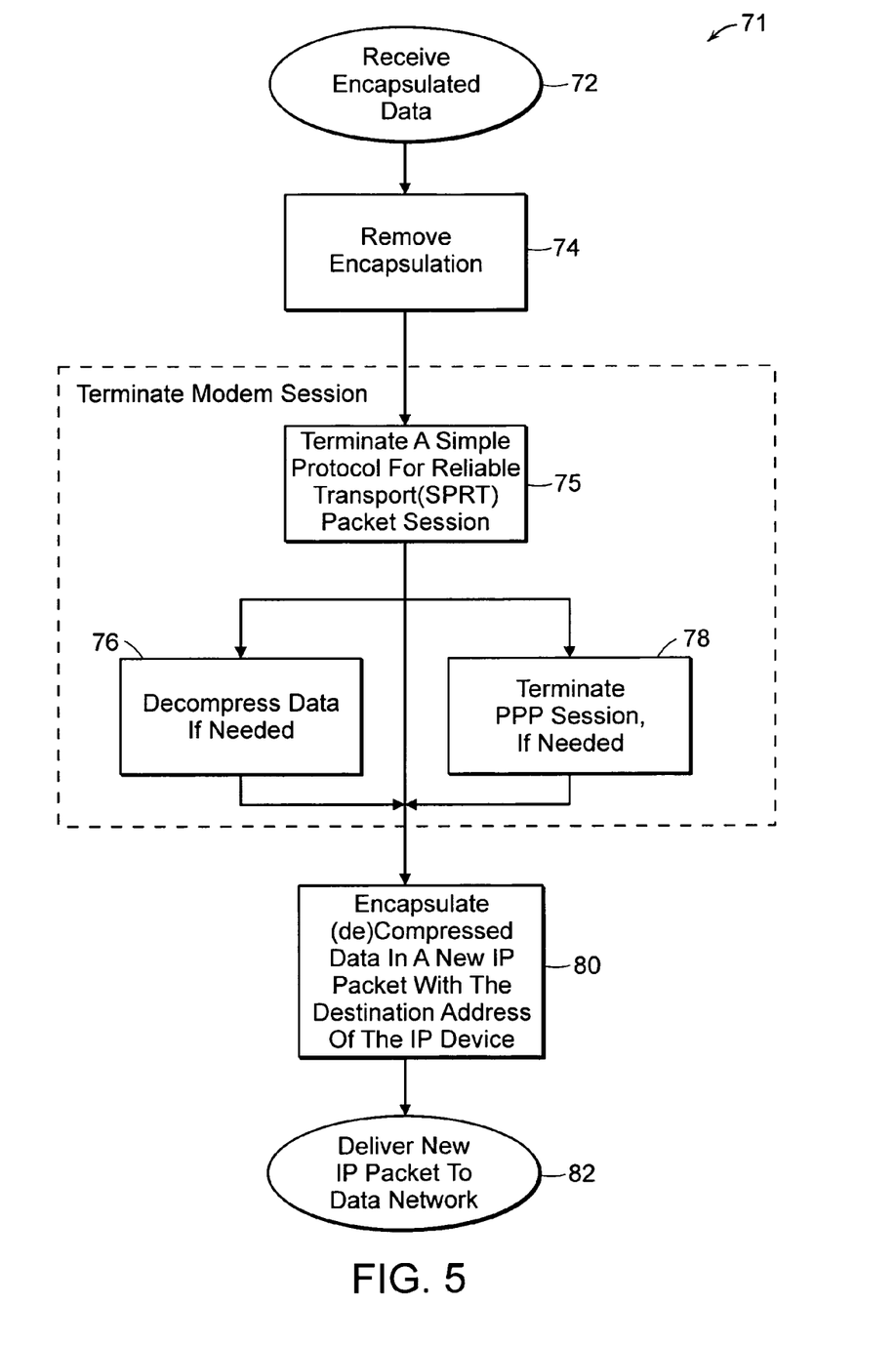
FIG. 5 is a generalized flow diagram of an embodiment of a process executed by a processor in the MRA of FIG. 4.

Referring to FIG. 5, the MRA 55 executes a process 71, which is part of the software 62 (FIG. 4), when receiving IP packets 65a from the originating gateway 20 in the form of encapsulated data (Step 72) possibly in a PPP session. The process 71 removes the encapsulation (Step 74) and provides termination for a modem session for transporting data across a VoIP network using a modem relay technique. For example, the modem session may employ a Simple Packet Relay Transport (SPRT) (Step 75). The process 71 may decompress the data (Step 76), terminate a point-to-point protocol (PPP) session (Step 78), both, or neither.

Once all the data is collected, the process 71 encapsulates the compressed or uncompressed data in a new IP packet with the destination address of the end node IP device (Step 80). The process 71 ends when the data in the new IP packets have been delivered to the data network for receipt by the end node IP device.

Figure 6:
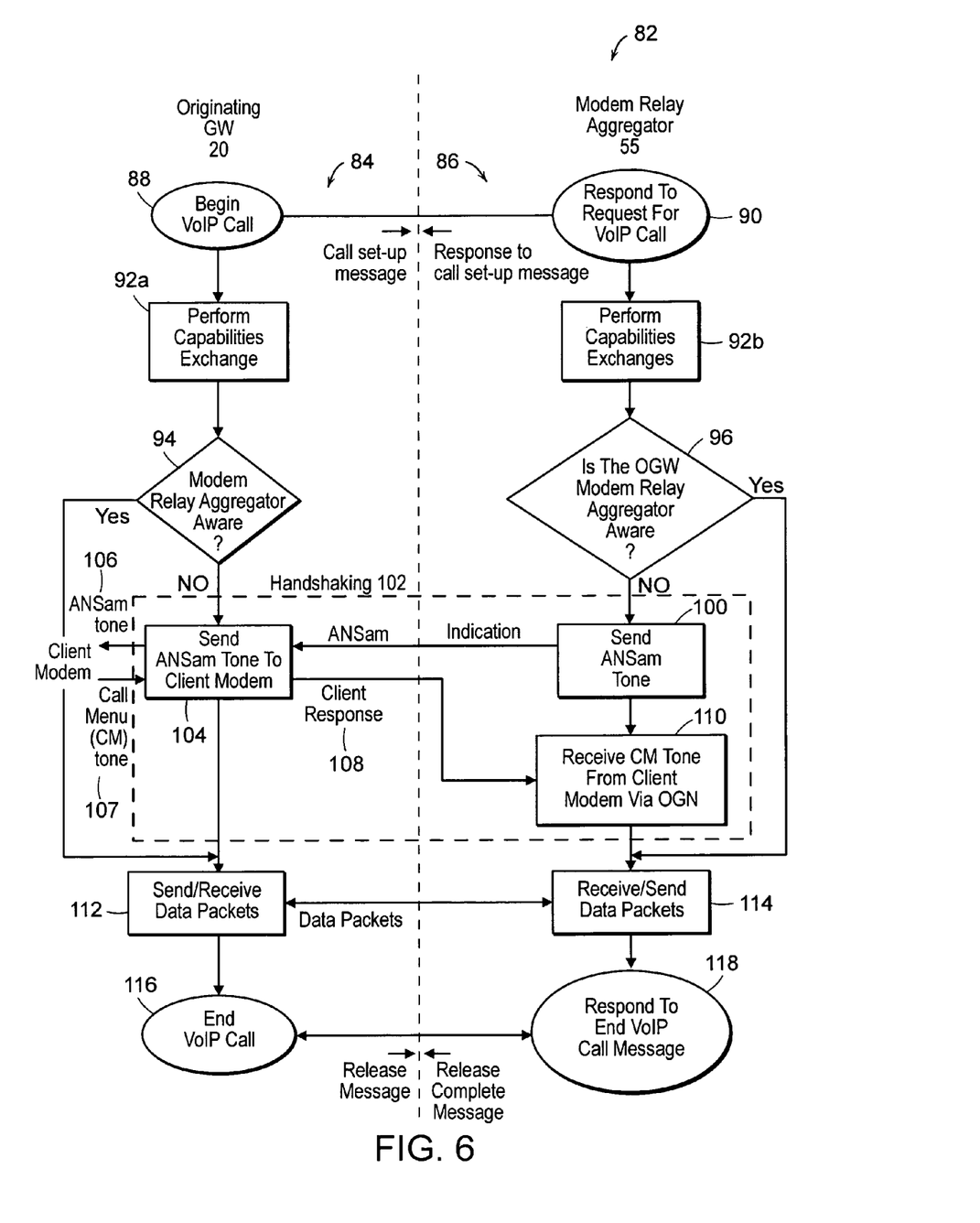
FIG. 6 is a flow diagram of a process used to transfer data from an originating gateway (OGW) in the network to the MRA of FIG. 4.

FIG. 6 is a detailed flow diagram of a process 82 conducted between the MRA 55 and the originating gateway 20. The process 82 may be used when data is sent from the originating gateway 20 through the MRA 55 to the end node (not shown). The process 82 includes (i) a first subprocess 84 executed by the originating gateway 20, referred to as the OGW subprocess 84, and (ii) a second subprocess 86, which is part of the software 62 (FIG. 4) executed by the processor(s) 61 in the MRA 55 and referred to as the MRA subprocess 86.

The process 82 begins with the OGW subprocess 84 sending a request for a VoIP call (Step 88) to the MRA 55. The MRA subprocess 86 responds to the request for the VoIP call (Step 90). Each of the subprocesses 84, 86 performs a capabilities exchange (CE) (Steps 92a and 92b, respectively). During the capabilities exchange, the OGW 20 and MRA 55 exchange information regarding the signaling methods supported, codec type, and redundancy.

Following the capabilities exchange (Steps 92a and 92b), the subprocesses 84, 86 determine whether the OGW 20 is Modem Relay Aggregator (MRA) aware or only knows of traditional terminating gateway and Remote Access Server (RAS) technology (Steps 94 and 96). If the newer technology is known to the OGW 20, then the processes advance directly to data transfer (Steps 112 and 114). If working in a traditional technology state, handshaking is performed, starting with the MRA subprocess 86 sending an ANSam tone or indication (Step 100) to the OGW 20, which is detected by the OGW subprocess 84 (Step 104).

The OGW subprocess 84 receives the ANSam indication and generates a corresponding ANSam tone (Step 104) to its client device (Step 106) and the OGW receives the client modem response such as a Call Menu (CM) tone or response from its client device (Step 107). The CM response is sent (Step 108) by the OGW 20 to the MRA 55, where it is received (Step 110) by the MRA 55.

At this point in the subprocesses 84, 86, both the OGW subprocess 84 and the MRA subprocess 86 work together to send and receive data packets (Steps 112 and 114). The call is completed (Steps 116 and 118) through a 'release' message and 'release complete' message, respectively, or some other manner commonly known in the art.

The handshaking described above may include additional, equivalent, or other steps. For example, after the voice call establishment and capabilities exchange, the OGW 20 and MRA 55 may establish the way to send ANSam indication. The methods possible for sending ANSam indications may include RFC2822 events or Voice Band Data (VBD) indications.

Figure 7:
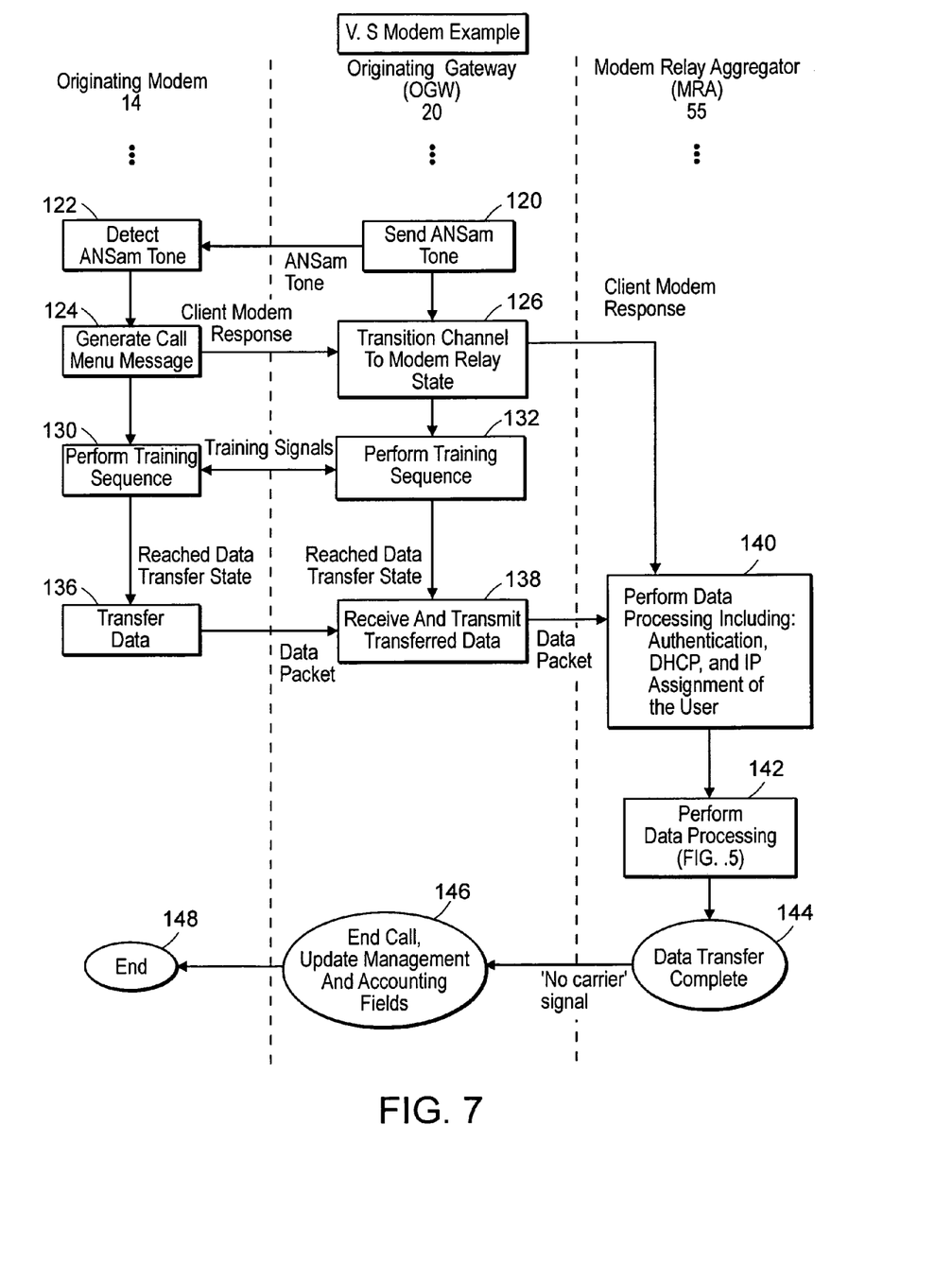
FIG. 7 is a flow diagram of an example data exchange between the MRA of FIG. 4, OGW, and an originating modem using a V.8 modem protocol.

To illustrate the processes just discussed, FIG. 7 is a flow diagram of a process of a high speed V.8 modem protocol used to transfer data using the MRA 55. Operation is conceptually similar for other modulations, although specific modem events are different for other modulations.

Referring to FIG. 7, the OGW 20 sends an ANSam tone (Step 120) to the originating modem 14, which detects the ANSam tone (Step 122). The originating modem 14 generates a 'call menu' message (Step 124) that is sent back to the OGW 20 (assuming it is a V.8 modem, which includes V.34, V.90, and V.92). Once the CM message is detected by the OGW 20, the OGW 20 can switch to Modem Relay mode (Step 126). Following the transition to Modem Relay mode, the OGW 20 begins a training sequence with the originating modem 14 (Steps 132 and 130, respectively).

When the originating modem 14 and the OGW 20 reach a data transfer state, data received from the originating modem 14 (Steps 136 and 138) is passed to the MRA 55. The MRA 55 performs data processing on the received data packets (step 140). This data processing includes removing any headers associated with the IP transport layer (e.g. Simple Packet Relay Transport (SPRT)), decompresses the data (if needed) and strips any PPP framing associated with the packet stream, as discussed above in reference to FIG. 5.

Continuing to refer to FIG. 7, when the MRA 55 begins to receive data packets, it performs some preliminary data processing, including: authentication, dynamic host configuration protocol (DHCP) processing, and IP assignment of the user. When this data processing is complete, the user sends data to the MRA 55. The MRA 55 strips any transport headers, decompresses the data (if needed), and encapsulates the data in new IP packets before directing it to the IP data network (Step 142). When the OGW 20 detects a 'no carrier' signal, the session is complete (Step 144), the call is "torn down", the management and accounting fields are updated (Step 146), and the process ends (Step 148).

Figure 8:
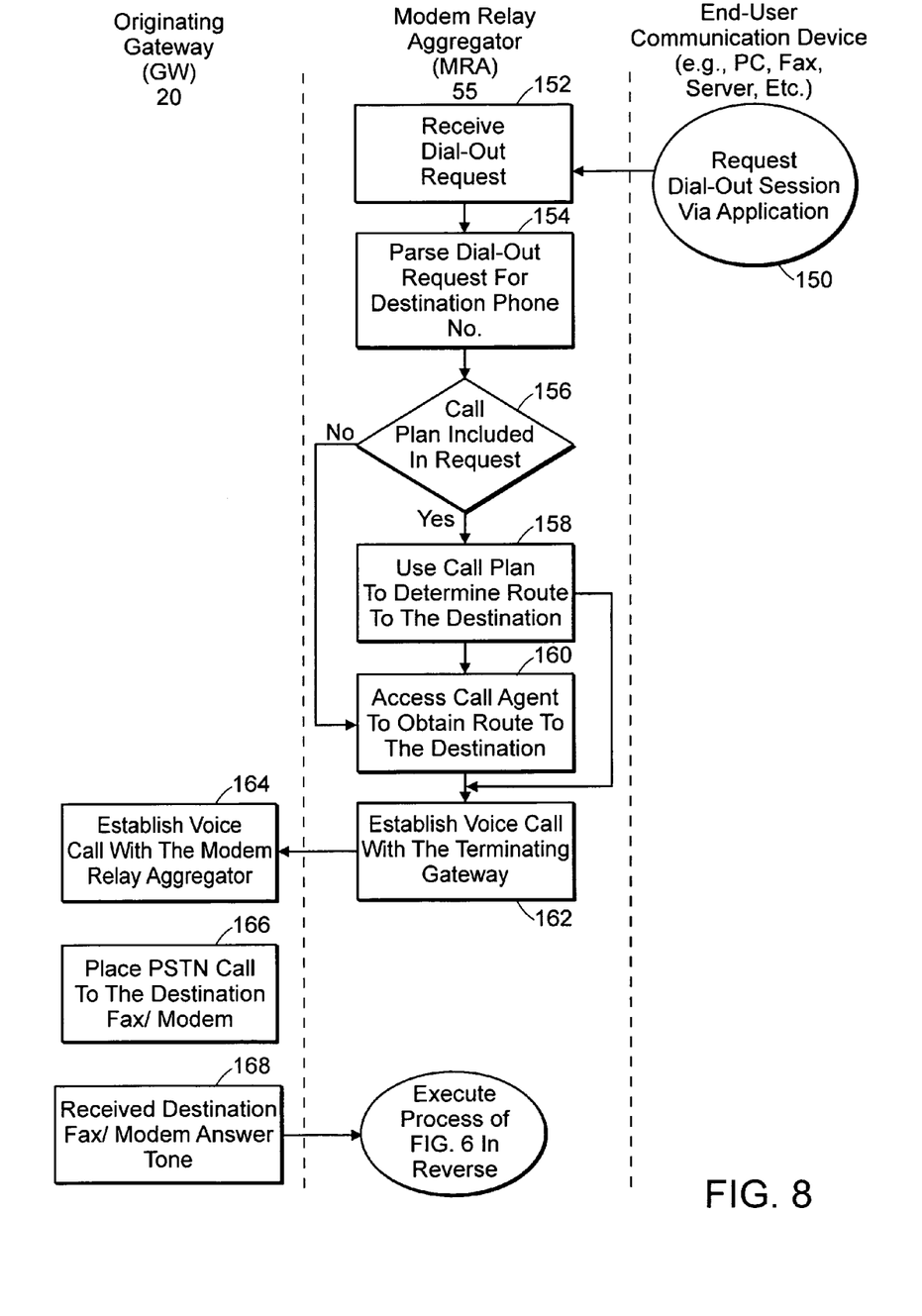
FIG. 8 is a flow diagram of a process in the MRA of FIG. 4 used for a dial-out session.

FIG. 8 provides a flow diagram of a process for a case in which the MRA 55 acts as the originating device for a dial-out session initiated by an end user having an IP computing device. The scenario is used to originate calls for dial sessions (to access the remote telemetry information from pay phones and home security systems, for example).

When a device (e.g., personal computer) requests a dial-out session) (Step 150), it uses an application to communicate with the MRA 55. The MRA 55 receives a dial-out request (Step 152) from the application, parses the request for a destination phone number (Step 154), and refers to a dial plan to determine the route to the destination (Steps 156 and 158). Alternatively, the MRA 55 may obtain the route through a dial-plan maintained by a call agent (Step 160).

The MRA 55 establishes a voice call (Steps 162 and 164) with the terminating gateway (referred to as the OGW 20 in the dial-in direction), which places a PSTN call to a destination modem (Step 166), as defined by the destination phone number. Once the destination modem/generates an answer tone and the terminating gateway detects the answer tone (Step 168), the same process described above (Step 170) takes place, only the devices and handshaking directions are reversed.

Figure 9:
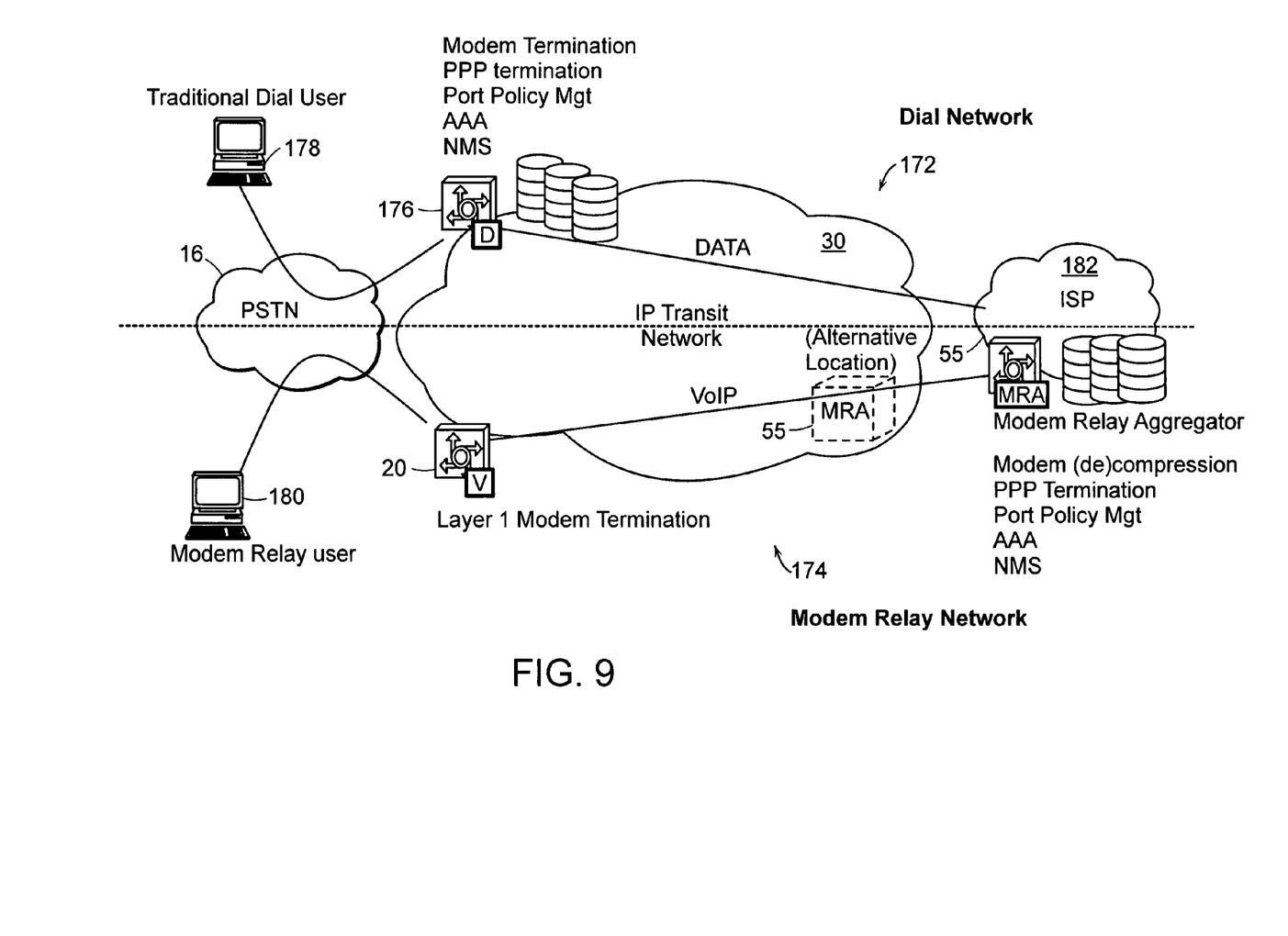
FIG. 9 is a network diagram of the MRA of FIG. 4 being used in alternative locations in the computer network.

FIG. 9 is an architectural diagram of a network having two sub-networks, a dial network 172 and a modem relay network 174. The modem relay network 174 has an architecture as discussed above where a modem relay user 180 connects to the originating gateway 20 via the PSTN 16, and the OGW 20 has a Layer 1 modem termination. The MRA 55 receives VoIP packets via the IP transit network 30 from the OGW 20. The MRA 55 provides modem (de)compression, PPP termination, port policy management, AAA, and NMS functions. The MRA 55 is employed by the ISP 182 to provide digital service to end users (not shown).

As discussed above, the modem relay network 174 can use as few as one digital signal processor to support the transmission of modem data from the modem relay user 180 to an end user at the ISP 182, where the DSP is located at the OGW 20 to support the modulation/demodulation processing of the modem signals.

Referring now to the dial network 172, a traditional dial user 178 connects to an associated Remote Access Server. This represents the traditional method of terminating modem sessions in which dedicated data networks transport the user's data to the Internet. With modem relay, a voice network can transport the modem session, which is a more efficient use of one network. The MRA reduces the number of DSPs used in the voice network from three to as few as one.

It should be understood that the MRA 55 can be moved to the edge of the IP transit network 30, as shown. In this case, a voice carrier network provider would be responsible for the MRA 55 instead of an Internet service provider. The decision of where to place the MRA 55 is thus a business decision.

Figure 10:
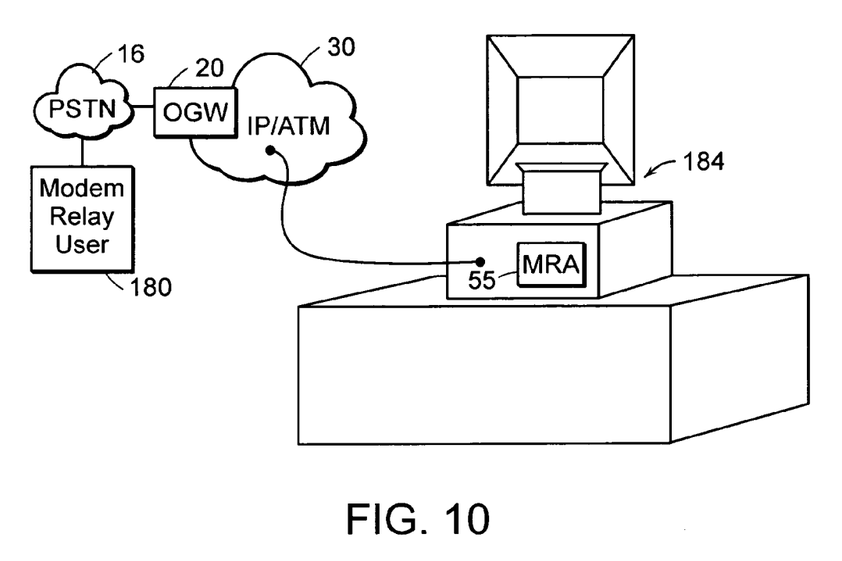
FIG. 10 is a block diagram of a general purpose computer executing software as described in FIGS. 5-8 providing the functionality of the MRA of FIG. 4.

FIG. 10 is a network diagram in which the MRA 55 is employed in a personal computer (PC) 184 or other general computing device that is capable of providing host-based functionality. The MRA 55, in this particular embodiment, may be implemented entirely in software, executed by a general purpose processor (not shown) in the PC 184. The network to which the PC 184 is connected may be as discussed above in reference to the modem relay network 174 (FIG. 9) or dial network 172.

Alternatively, the MRA 55 may be implemented in hardware or firmware in a plug-in card installed in the PC 184 or may be some combination of software executable by a general purpose processor, custom processor, or plug-in card solution. The software may be stored locally in the memory unit(s) 68 (FIG. 4), which may include RAM, ROM, CD-ROM, magnetic or optical disk, etc., or may be stored remotely and downloaded via network communications.

Figure 11:
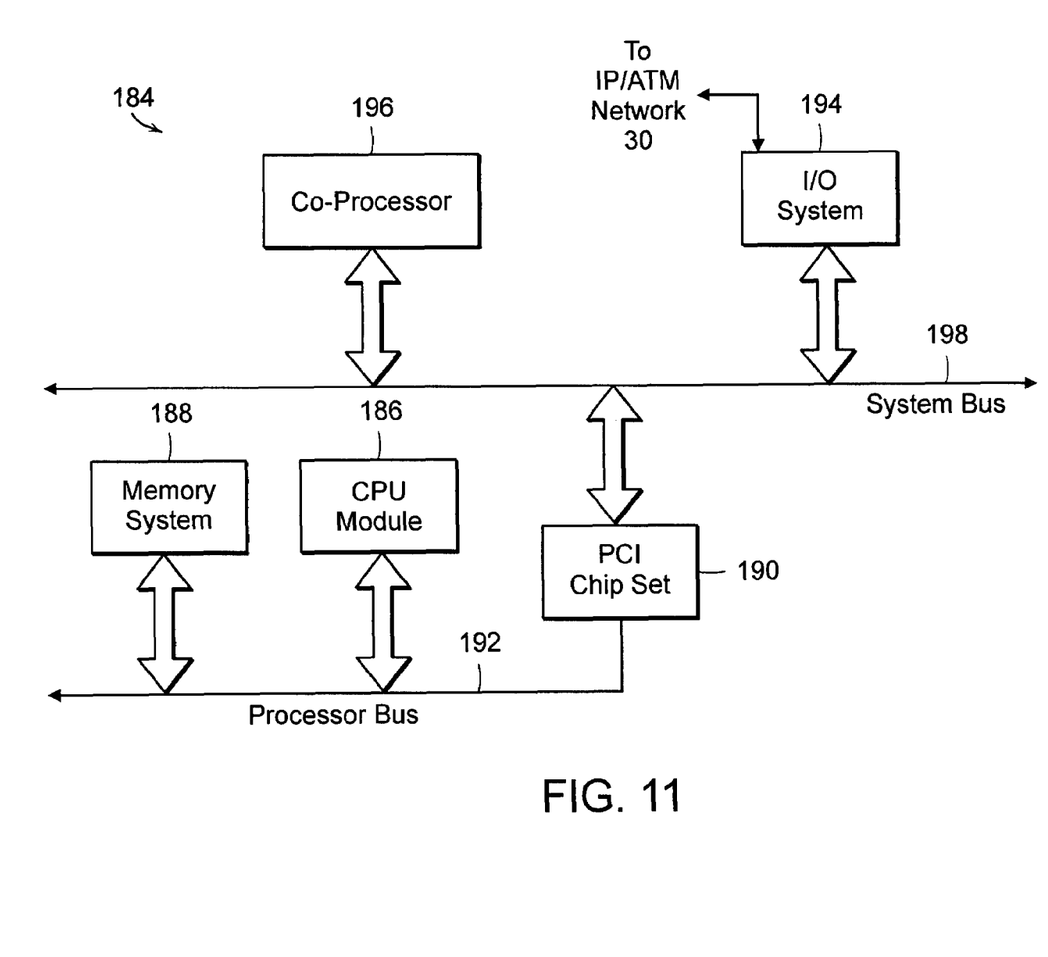
FIG. 11 is a schematic diagram of the general purpose computer system of FIG. 10 capable of executing a host-processor-based embodiment of the MRA.

FIG. 11 is a schematic diagram of the computer system 184 that includes a central processing module 186, a memory system 188 and a Peripheral Component Interconnect (PCI) chip set 190 connected by a processor bus 192. The PCI chip set 190 is further connected to an I/O system 194 and a co-processor module 196 by a system bus 198. The central processing module 186 loads and executes the modem relay aggregator software 62 (FIG. 4) from the memory system 188, where the modem relay aggregator software 62 is host-processor-based in this particular embodiment. The I/O system 194 provides an interface to the IP/ATM network 30.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for terminating a modem session for transporting data across a voice-over-Internet Protocol (VoIP) network using a modem relay (MR) technique, the method comprising:
   receiving a modem session packet over a first packet-based network from an originating gateway without handshaking and without sending an indication of an ANSam tone to the originating gateway over the first packet-based network, the modem session packet to transport data represented by modem signals from a client modem in demodulated form;
   removing from the modem session packet, headers associated with transporting the data over the first packet-based network;
   terminating the modem session and making the data available for further transport over a second packet-based network;
   encapsulating the data in an Internet Protocol (IP) packet with a destination address of an IP device for further transport over the second packet-based network; and
   delivering the IP packet to the IP device over the second packet-based network.

2. The method according to claim 1 including receiving the data from a gateway across an IP packet transport network.

3. The method according to claim 1 further including receiving the data from a gateway across a local area network.

4. The method according to claim 1 further including receiving the data packet from a first computer network and wherein delivering the IP packet to the IP device causes the IP packet to travel across a second computer network.

5. The method according to claim 1 absent supporting physical layer protocol processing.

6. The method according to claim 5 wherein physical layer protocol processing includes error detection and error correction processing.

7. The method of claim 1 wherein terminating the modem session and making the data available for further transport over the second packet-based network includes decompressing the data transported over the first packet-based network by the modem session packet.

8. The method of claim 1 wherein terminating the modem session and making the data available for further transport over the second packet-based network includes performing application layer processing on the data transported over the first packet-based network by the modem session packet.

9. The method according to claim 1 provided as host-processor-based software executed on a general purpose computing device.

10. An apparatus for transporting data across a voice-over-Internet Protocol (VoIP) network using a modem relay (MR) technique, the apparatus comprising:
    a receiving unit to receive a modem session packet over a first packet-based network from an originating gateway without handshaking and without sending an indication of an ANSam tone to the originating gateway over the first packet-based network, the modem session packet to transport data represented by modem signals from a client modem in demodulated form
    a filter coupled to the receiving unit to remove from the modem session packet, headers associated with transporting the data over the first packet-based network;
    a terminating unit coupled to the filter to terminate the modem session and to make the data available for further transport over a second packet-based network;
    an encapsulation unit coupled to the terminating unit to encapsulate the data in an Internet Protocol (IP) packet with a destination address of an IP device; and
    a transmit unit coupled to the encapsulation unit to deliver the new IP packet to the IP device via the second packet-based network.

11. The apparatus according to claim 10 further including a receiver to receive the packetized data from a gateway across an IP packet transport network.

12. The apparatus according to claim 10 further including a receiver to receive the packetized data from a gateway across a local area network.

13. The apparatus according to claim 10 further including a receiver to receive the data packet from a first computer network and wherein the transmit unit delivers the IP packet to a second data network.

14. The apparatus according to claim 10 absent a signal processor to support physical layer protocol processing.

15. The apparatus according to claim 14 wherein the physical layer protocol processing includes error detection and error correction processing.

16. The apparatus according to claim 10 wherein the terminating unit includes a decompression unit to decompress the data transported over the first packet-based network by the modem session packet, and to terminate the modem session and to make the data available for further transport over a second packet-based network.

17. The apparatus according to claim 10 wherein the terminating unit includes an application layer processing unit to perform application layer processing on the data transported over the first packet-based network by the modem session packet, and to terminate the modem session and to make the data available for further transport over a second packet-based network.

18. The apparatus according to claim 10 provided as host-processor-based software executed on a general purpose computing device.

19. An apparatus for terminating a modem session for transporting data across a voice-over-Internet Protocol (VoIP) network using a modem relay (MR) technique, the apparatus comprising:
    means for receiving a modem session packet over a first packet-based network from an originating gateway without handshaking and without sending an indication of an ANSam tone to the originating gateway over the first packet-based network, the modem session packet to transport data represented by modem signals from a client modem in demodulated form;
    means for removing from the modem session packet, headers associated with transporting the data the first packet-based network;
    means for decompressing the modem session packet to terminate the modem session and to make the data available for further transport over a second packet-based network;
    means for performing application layer processing on the modem session packet to terminate the modem session in manner using less processing than originating the modem session, and to make the data available for further transport over the second packet-based network;

means for encapsulating the data in an Internet Protocol (IP) packet with a destination address of an IP device; and means for delivering the new IP packet to the IP device via the second packet-based network.

20. The apparatus according to claim 19 provided as host-processor-based software executed on a general purpose computing device.

21. A computing device for terminating a modem session for transporting data across a voice-over-Internet Protocol (VoIP) network using a modem relay (MR) technique, the computing device comprising:

a first interface coupled to a first packet-based network to receive a modem session packet used to transport data represented by modem signals in demodulated form over the first packet-based network from an originating gateway without handshaking and without sending an indication of an ANSam tone to the originating gateway over the first packet-based network;

a second interface coupled to a second packet-based network to send the terminated modem session packet as an IP packet over the second packet-based network;

a memory unit storing software to operate on the received encapsulated data; and a processor coupled to the first interface, the second interface, and the memory unit, the processor loading the software and executing the software to:

remove from the modem session packet, headers associated with transporting data represented by modem signals in demodulated form over a first packet-based network;

act as a termination point for the session at the terminating gateway;

decompress the modem session packet to terminate the modem session in manner using less processing than originating the modem session, and to make the data available for further transport over a second packet-based network;

perform application layer processing on the modem session packet to terminate the modem session in manner using less processing than originating the modem session, and to make the data available for further transport over the second packet-based network;

encapsulate the data in an Internet Protocol (IP) packet with a destination address of an IP device; and deliver the new IP packet to the IP device over the second packet-based network.

22. The computing device according to claim 21 wherein the software is host-processor-based software configured to be executed on a general purpose computing device.

23. A computer-readable medium having stored thereon sequences of instructions, the sequences of instructions, when executed by a digital processor, causes the processor to:

receive a modem session packet over a first packet-based network from an originating gateway without handshaking and without sending an indication of an ANSam tone to the originating gateway over the first packet-based network, the modem session packet to transport data represented by modem signals from a client modem in demodulated form;

remove from the modem session packet, headers associated with transporting the data over the first packet-based network;

terminate a modem session and make the data available for further transport over a second packet-based network;

encapsulate the data in an Internet Protocol (IP) packet with a destination address of an IP device for further transport over the second packet-based network; and deliver the new IP packet to the IP device over the second packet-based network.

24. The computer-readable medium according to claim 23 wherein the sequences of instructions are configured as host-processor-based software executed on a general purpose computing device.

* * * * *